(12) United States Patent
Matsumoto

(10) Patent No.: US 10,169,504 B2
(45) Date of Patent: Jan. 1, 2019

(54) ACHIEVING POWER SUPPLY AND HEAT DISSIPATION (COOLING) IN THREE-DIMENSIONAL MULTILAYER PACKAGE

(71) Applicant: INTERNATIONAL BUSINESS MACHINES CORPORATION, Armonk, NY (US)

(72) Inventor: Keiji Matsumoto, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 682 days.

(21) Appl. No.: 14/740,906

(22) Filed: Jun. 16, 2015

(65) Prior Publication Data

US 2015/0278417 A1    Oct. 1, 2015

Related U.S. Application Data

(62) Division of application No. 13/850,386, filed on Mar. 26, 2013, now Pat. No. 9,330,213.

(51) Int. Cl.
*G06F 17/50* (2006.01)
*H05K 7/20* (2006.01)
*H05K 3/10* (2006.01)

(52) U.S. Cl.
CPC ...... *G06F 17/5036* (2013.01); *G06F 17/5009* (2013.01); *G06F 17/5068* (2013.01);
(Continued)

(58) Field of Classification Search
None
See application file for complete search history.

(56) References Cited

U.S. PATENT DOCUMENTS 4,886,573 A * 12/1989 Watanabe ........... H01L 21/0272
216/18
5,578,869 A    11/1996 Hoffman et al.
(Continued)

FOREIGN PATENT DOCUMENTS

JP    2003-318361 A    11/2003
JP    2006-093659 A    4/2006
(Continued)

OTHER PUBLICATIONS

Notice of Allowance dated Feb. 8, 2016, received in a related U.S. Appl. No. 13/850,386.

*Primary Examiner* — Kibrom K Gebresilassie
(74) *Attorney, Agent, or Firm* — Scully, Scott, Murphy & Presser, P.C.; David Quinn, Esq.

(57) ABSTRACT

A computer-implemented structure for optimizing a route for power supply and heat dissipation in a multilayer chip. The method includes: setting a heat conductive thermal value for the multilayer chip by way of density, preparing a substrate that contains silicon where a wiring layer is formed facing the upper surface side of the multilayer chip, setting the power from the wiring layer of the substrate that uses silicon, manipulating the value of the power supply, and manipulating the heat conductive thermal value based on density. Both apparatus's include an organic substrate, a multilayer chip, a substrate containing silicon, a wiring layer, and a heat dissipater, wherein the components are configured to perform the steps of the above method. The method of configuring an apparatus ensures that all the multilayer chips are stored in the concave part of the organic substrate.

4 Claims, 12 Drawing Sheets

(52) U.S. Cl.
CPC .............. *H05K 3/10* (2013.01); *H05K 7/205* (2013.01); *H01L 2224/16146* (2013.01); *H01L 2224/16227* (2013.01); *H01L 2224/17181* (2013.01); *H01L 2224/32145* (2013.01); *H01L 2224/32225* (2013.01); *H01L 2224/73204* (2013.01); *H01L 2225/06513* (2013.01); *H01L 2225/06517* (2013.01); *H01L 2225/06541* (2013.01); *H01L 2225/06565* (2013.01); *H01L 2225/06589* (2013.01); *H01L 2924/15311* (2013.01); *Y10T 29/49162* (2015.01)

(56) References Cited

U.S. PATENT DOCUMENTS

| | | | |
|---|---|---|---|
| 5,583,377 A | 12/1996 | Higgins, III | |
| 5,645,123 A * | 7/1997 | Doi | H01L 23/34 165/48.1 |
| 5,736,785 A * | 4/1998 | Chiang | H01L 23/4334 257/712 |
| 5,844,168 A | 12/1998 | Schueller et al. | |
| 6,262,392 B1 * | 7/2001 | Morton | H05B 3/00 219/209 |
| 6,340,842 B1 | 1/2002 | Nakamura | |
| 6,476,885 B1 | 11/2002 | Murray et al. | |
| 6,552,428 B1 * | 4/2003 | Huang | H01L 21/565 257/704 |
| 6,566,749 B1 | 5/2003 | Joshi et al. | |
| 6,781,056 B1 * | 8/2004 | O'Rourke | H05K 1/0212 174/255 |
| 7,446,420 B1 | 11/2008 | Kim | |
| 7,472,363 B1 * | 12/2008 | Chandra | G06F 17/5009 716/106 |
| 7,586,064 B1 * | 9/2009 | Smith | H05B 1/0233 219/497 |
| 8,106,505 B2 | 1/2012 | Bernstein et al. | |
| 8,212,365 B2 * | 7/2012 | Sunohara | H01L 23/49822 257/686 |
| 8,231,692 B2 * | 7/2012 | Goetz | H01L 23/291 29/25.01 |
| 8,981,259 B2 * | 3/2015 | Chou | H05B 1/02 219/209 |
| 9,330,213 B2 * | 5/2016 | Matsumoto | H05K 7/205 |
| 9,627,291 B2 * | 4/2017 | Uekusa | H01L 23/345 |
| 2003/0116836 A1 | 6/2003 | Huang et al. | |
| 2005/0166168 A1 * | 7/2005 | Chandra | G06F 17/5009 716/113 |
| 2006/0226538 A1 * | 10/2006 | Kawata | H01L 21/4871 257/701 |
| 2007/0026662 A1 | 2/2007 | Kawano et al. | |
| 2007/0216001 A1 | 9/2007 | Nakamura | |
| 2007/0246822 A1 | 10/2007 | Glover et al. | |
| 2007/0278632 A1 | 12/2007 | Zhao et al. | |
| 2007/0290322 A1 | 12/2007 | Zhao et al. | |
| 2008/0026503 A1 * | 1/2008 | Ryan | G05D 23/1928 438/54 |
| 2008/0173792 A1 | 7/2008 | Yang et al. | |
| 2009/0019411 A1 * | 1/2009 | Chandra | G06F 17/5009 716/119 |
| 2009/0024347 A1 * | 1/2009 | Chandra | G01K 7/425 702/130 |
| 2009/0133920 A1 * | 5/2009 | Kim | H05K 3/429 174/266 |
| 2010/0044856 A1 | 2/2010 | Sri-Jayantha et al. | |
| 2010/0155919 A1 | 6/2010 | Song et al. | |
| 2010/0163090 A1 | 7/2010 | Liu et al. | |
| 2011/0018119 A1 | 1/2011 | Kim et al. | |
| 2011/0074046 A1 * | 3/2011 | Sunohara | H01L 23/49822 257/778 |
| 2011/0101349 A1 | 5/2011 | Oda | |
| 2011/0291261 A1 * | 12/2011 | Fleischman | H01L 24/06 257/737 |
| 2011/0304036 A1 * | 12/2011 | Son | H01L 23/3128 257/693 |
| 2013/0015548 A1 * | 1/2013 | Chen | H01L 23/345 257/467 |
| 2013/0308278 A1 * | 11/2013 | Matsumoto | H05K 7/205 361/720 |

FOREIGN PATENT DOCUMENTS

| | | |
|---|---|---|
| JP | 2007-234881 A | 9/2007 |
| JP | 2010-073851 A | 4/2010 |

* cited by examiner

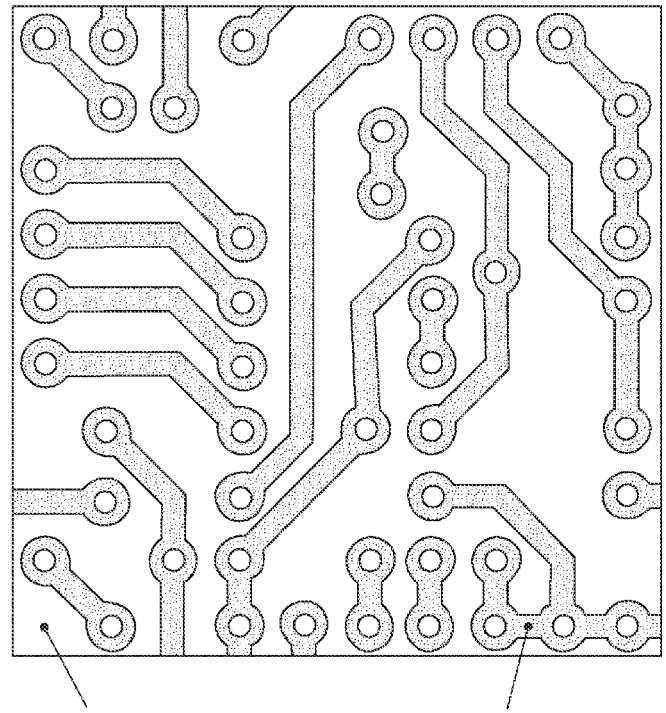

base made of polyimide or low-k material or the like example: (0.4 to 2) w/mk (thermal conductivity)

wiring pattern made of metal (such as copper) example: (400) w/mk (thermal conductivity)

If it is assumed that this wiring pattern covers 10% of the area, then:

▨ (400)w/mk × 0.1 = (40) ···· dominant contribution to heat conduction

☐ (0.4 ~ 2)w.mk × 0.9 = (0.36 ~ 1.8)···· almost no contribution to heat conduction becomes a heat resistor, so thinner is preferable

FIG. 5

ACHIEVING POWER SUPPLY AND HEAT DISSIPATION (COOLING) IN THREE-DIMENSIONAL MULTILAYER PACKAGE

CROSS-REFERENCE TO RELATED APPLICATION

This application is a divisional of U.S. patent application Ser. No. 13/850,386, filed Mar. 26, 2013, which claims priority under 35 U.S.C. § 119 from Japanese Patent Application No. 2012-115933 filed May 21, 2012, the entire contents of which are incorporated herein by reference.

BACKGROUND OF THE INVENTION

1. Field of the Intention

The present invention relates to an structure for a three-dimensional package where a plurality of chips are overlaid, that enables both power supply and heat dissipation.

2. Description of Related Art

A three-dimensional multilayer package has a plurality of chips overlaid. Currently, there are problems with how to provide power to these chips and how to cool or dissipate heat generated from these chips.

When most of the power for an electric circuit is supplied based on unit volume there is a basic relationship that most of the heat will be generated per unit volume and in conjunction with progress towards higher density and higher integration.

Japanese Patent Application 2003-318361 discloses technology for a three-dimensional multilayer structure where heat passes through an interposer with a wiring layer and is dissipated to the surroundings by a heat spreader.

Japanese Patent Application 2006-93659 discloses technology that provides power by a silicon interposer with the wiring layer.

Japanese Patent Application 2010-73851 provides a plurality of heat dissipating layers formed in layers and as many heat conductive (thermal) via as possible without causing an increase in the size of the heat dissipating member, as an attempt to link to a larger heat dissipating member and to enhance heat dissipation.

Further discussion concerning improvisations do not develop a route for supplying power and a route for dissipating heat. Recently, increasing density and increasing integration have reached a level where a structure that achieves both power supply and cooling spatially and three dimensionally must be considered.

SUMMARY OF INVENTION

Accordingly, in one aspect, the present invention provides a computer-implemented method for simulating an apparatus that optimizes power supply and heat dissipation for a multilayer chip from an upper surface side of the multilayer chip, including the steps of: setting a heat conductive thermal initial value by way of density for the multilayer chip; preparing a substrate that uses silicon where a wiring layer is formed on the bottom surface side facing the upper surface side of the multilayer chip; setting the initial value of the power supply for the multilayer chip from the wiring layer of the substrate that uses silicon; increasing or decreasing the initial value of the power supply until optimized within a predetermined range; and increasing or decreasing the heat conductive thermal initial value by way of density until optimized within a predetermined range.

Another aspect of the present invention provides an apparatus that performs power supply and heat dissipation from the upper surface side of a multilayer chip, the apparatus including: an organic substrate located on the lower surface side of the multilayer chip; a substrate that uses silicon where a wiring layer is formed on the bottom surface side facing the upper surface side of the multilayer chip; a heat dissipater that dissipates heat directly above the upper surface side of the substrate that uses silicon; the organic substrate and wiring layer are formed on the substrate that uses silicon and are electrically connected in the periphery of the multilayer chip; and the multilayer chip, on the upper surface side, receives power through the wiring layer.

According to another aspect of the present invention, an apparatus that performs power supply and heat dissipation for a multilayer chip from an upper surface side of the multilayer chip, the apparatus including: an organic substrate located on the lower surface side of the multilayer chip; a substrate that uses silicon where a wiring layer is formed on the bottom surface side facing the upper surface side of the multilayer chip; the organic substrate and the wiring layer are electrically connected in the periphery of the multilayer chip; and the multilayer chip only receives power from the wiring layer formed on the organic substrate from the lower surface side of the multilayer chip.

Yet another aspect of the present invention provides a method of configuring an apparatus that performs power supply and heat dissipation for a multilayer chip from an upper surface side of the multilayer chip, including the steps of: providing a heat dissipater; preparing, on the lower surface side of the heat dissipater, a substrate that uses silicon where a wiring layer, with a thickness, is formed on the bottom surface side facing the upper surface side of said multilayer chip; using a thermal interface material to connect the heat dissipater and the upper surface side of the substrate that uses silicon; connecting the upper surface side of the multilayer chip with the wiring layer; and connecting an organic substrate, having a concave shape, to both the lower surface side of the multilayer chip and the wiring layer, ensuring that all of the multilayer chips are stored in the concave part of the organic substrate.

Thus, the present invention provides a structure that optimizes both a route for power supply and a route for heat dissipation for a multilayer chip.

BRIEF DESCRIPTION OF THE DRAWINGS

FIG. 5 is a schematic diagram illustrating the thermal resistance in the wiring layer, with a predetermined thickness, according to an embodiment of the present invention, which is formed facing the surface of the multilayer chip.

DETAILED DESCRIPTION OF PREFERRED EMBODIMENTS

Figure 1:
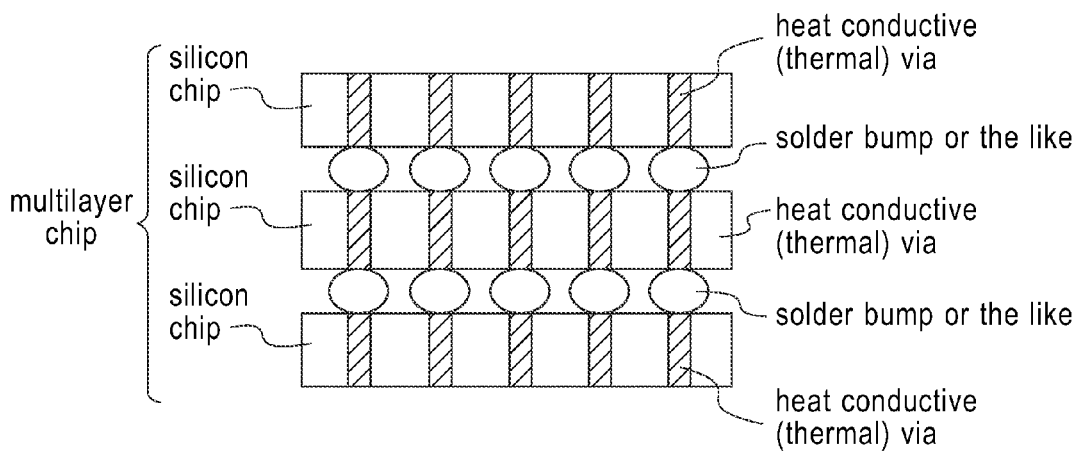
FIG. 1 is a schematic diagram illustrating the structure of a multilayer chip, corresponding to a side surface view or cross-section view of the multilayer chip in the present invention.

The present invention is directed at an enhanced structure for stimulation that optimizes both a route for power supply and a route for heat dissipation or cooling for a multilayer chip.

The present invention improvises and optimizes both power supply and heat dissipation from the upper surface side of a multilayer chip, where a plurality of chips are overlaid.

Aspects of the present invention can be embodied as a method or apparatus. Configuration and processing of preferred embodiments of the present invention with reference to the accompanying drawings are described herein below wherein identical objects are denoted by the same reference numeral in all of the drawings unless otherwise specified. It should be understood that embodiments that follow are intended to describe preferred aspects of the invention without limiting the scope thereof.

FIG. 1 is a schematic diagram illustrating the structure of a multilayer chip, corresponding to a cross-section view of the multilayer chip. In an embodiment of the present invention, three silicon chips are overlaid to form a multilayer chip. Other embodiments of the present invention include at least two silicon chips.

Heat conductive (thermal) via pass through the upper and the lower surface of each silicon chip. Generally, vias function as electrical connecting paths and/or thermal connecting paths and are primarily made of metal or intermetallic compounds.

In FIG. 1, vias are connected mechanically or electrically between silicon chips by solder bumps. In the present invention, solder bumps function as thermal connecting paths.

Figure 2:
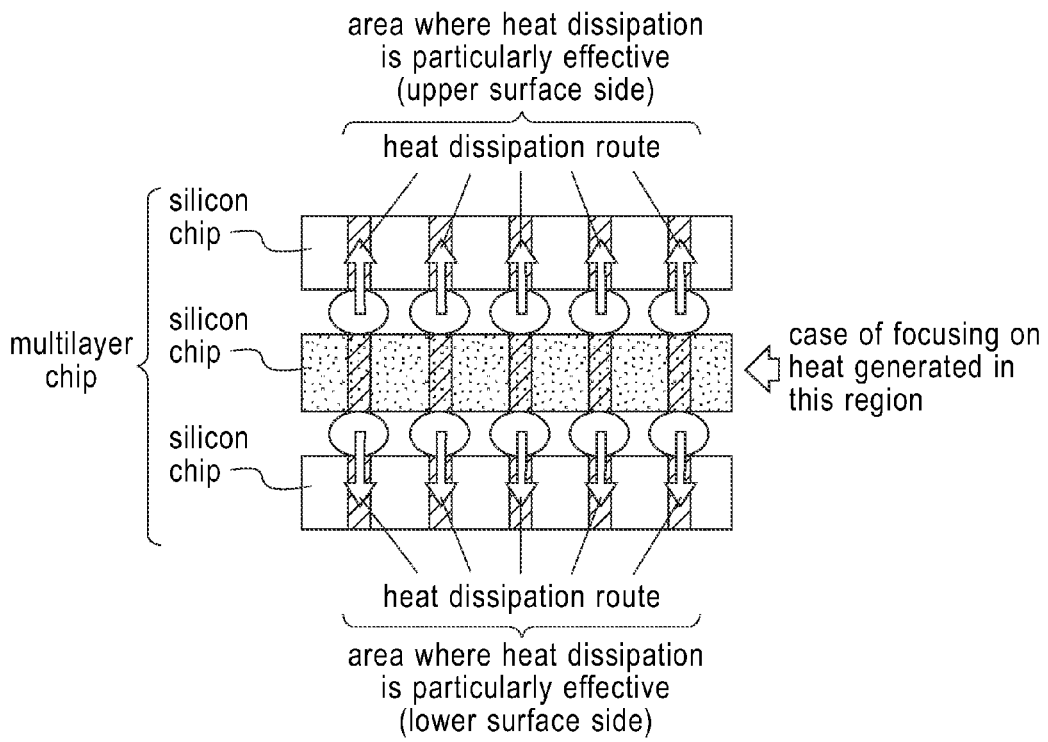
FIG. 2 is a schematic diagram illustrating the heat dissipating route and effective area of heat dissipation in the present invention.

FIG. 2 is a schematic diagram illustrating the heat dissipating route and effective area of heat dissipation in the present invention. When power is supplied to a silicon chip at least some level of heat is generated. FIG. 2 illustrates the heat dissipating route generated, in an embodiment of the present invention, by a middle silicon chip when three are provided. The heat generated from the middle silicon chip forms a heat dissipation route by a heat conductive (thermal) via in the silicon chip on the upper side and by a heat conductive (thermal) via in the silicon chip on the lower side. The heat dissipating route is formed by means of a solder bump included on the upper and lower surface.

In an embodiment of the present invention, the silicon chip on the top layer is an area where heat dissipation is effective on the upper surface side of the multilayer chip. The silicon chip on the bottom layer is an area where heat dissipation is effective on the lower surface side of the multilayer chip.

Figure 3:
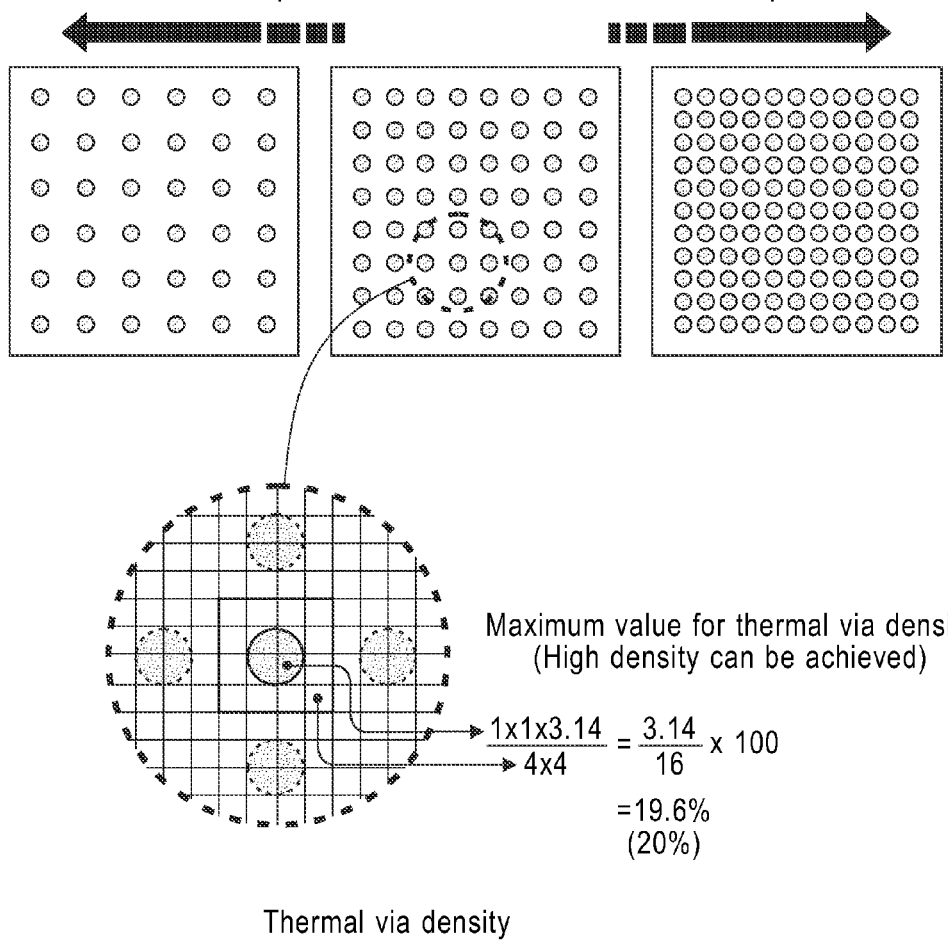
FIG. 3 is a schematic diagram describing the thermal via density corresponding to the multilayer chip in the present invention.

FIG. 3 is a schematic diagram describing the thermal via density corresponding to the multilayer chip. Thermal via density effects heat dissipation.

In an embodiment of the present invention, if thermal vias are sparsely distributed, as illustrated in the left block in FIG. 3, the heat dissipation will be inferior but the space on the silicon chip surface can be utilized for functions other than heat dissipation, for example as a wiring pattern. In another embodiment of the present invention, if the thermal vias are densely distributed, as illustrated in the right block in FIG. 3, the thermal via density increases and heat dissipation will be advantageous.

Thus, in the present invention an optimal value for the thermal via density can be assumed. As illustrated in FIG. 3, the maximum thermal via density that is generally conceivable is approximately 19.6% ($\approx$20%), within four thermal vias with a round planar shape (spatially cylindrical shape). In the present invention, it is possible to further increase the density, but this is not preferable for effective space utilization.

Figure 4:
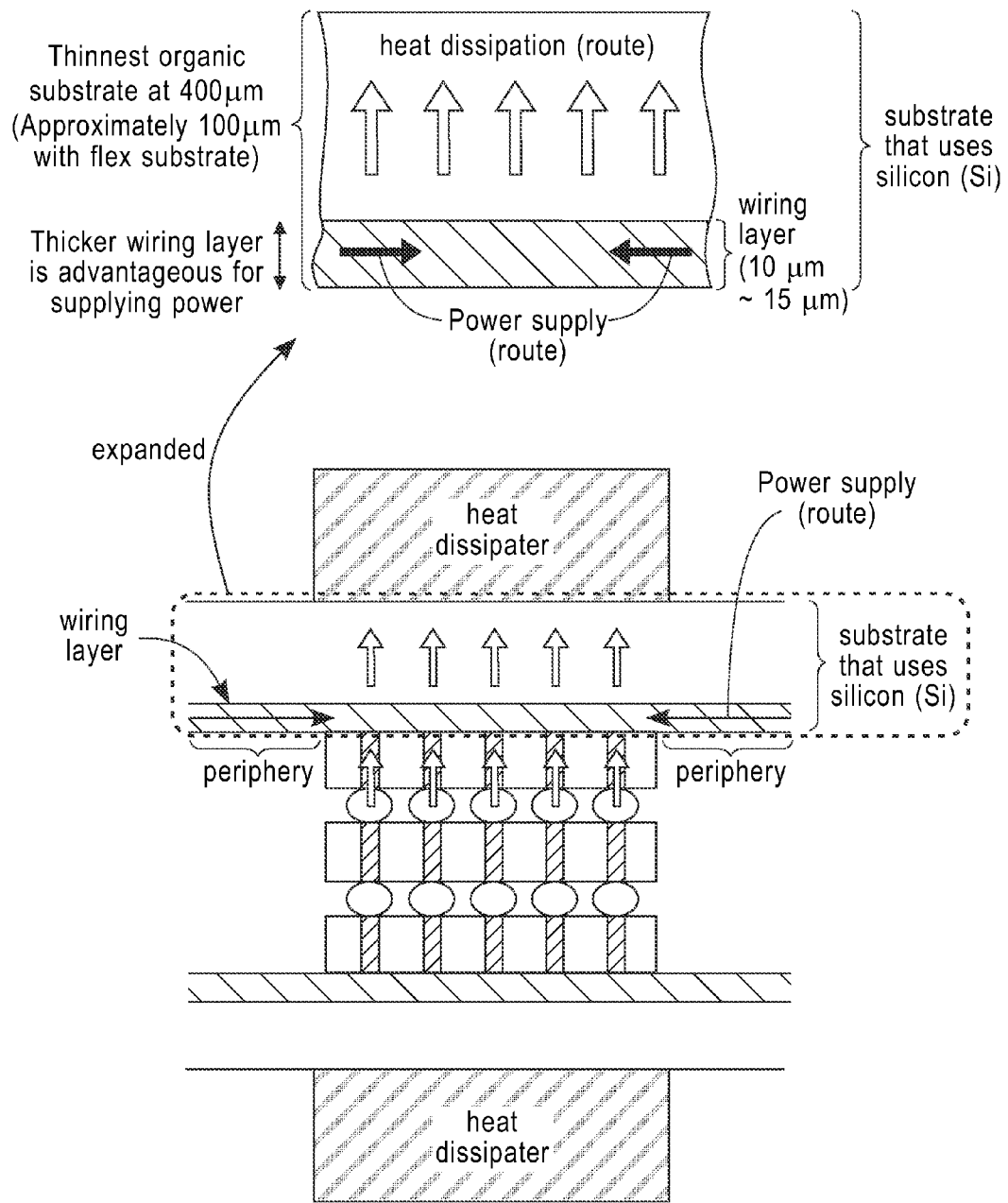
FIG. 4 is a schematic diagram illustrating how power is supplied through a wiring layer in the present invention.

FIG. 4 is a schematic diagram illustrating how power is supplied through a wiring layer to guide the heat dissipation route. In an embodiment of the present invention, when considering both the particularly effective area for heat dissipation and the heat dissipation route, dissipating heat directly above the multilayer chip will effectively guide the heat dissipation route.

In the present invention, establishing the heat dissipater establishes heat dissipation and is therefore a prerequisite in the design.

In an embodiment of the present invention, the heat dissipater can be mounted directly on the multilayer chip. In actuality, the multilayer chip operates electrically, thus power must be supplied to the multilayer chip through some route. In an embodiment of the present invention, power is supplied through the wiring layer. The wiring layer is formed with a predetermined thickness on the bottom surface side of the substrate that uses silicon (Si), facing the upper surface side of said multilayer chip In the present invention, the specific route for supplying power is from the periphery of the multilayer chip. A thicker wiring layer is advantageous for supplying power because it increases the current that flows per unit area.

In an embodiment of the present invention, for the substrate that uses Si, the thickness of the wiring layer can be reduced to approximately 10 µm. In another embodiment of the present invention, if the thickness is approximately 15 µm the wiring layer can be formed more easily.

Providing an organic substrate, in an embodiment of the present invention, requires the thickness of the wiring layer to be at least approximately 400 μm. In the present invention, providing a substrate such as Si permits high process precision, expecting similar precision from an organic material is unlikely. A thickness of approximately 100 μm can be achieved if a flex substrate is acceptable.

In the present invention, the wiring layer is a thickness within a range of 10 μm to 400 μm on an organic substrate when Si is used. In preferred embodiment of the present invention, the wiring layer will have a thickness within a range of 10 μm to 100 μm.

FIG. 5 is a schematic diagram illustrating the thermal resistance in the wiring layer. This wiring layer, formed with a predetermined thickness, is formed facing the surface of the multilayer chip in an embodiment of the present invention.

In the present invention, the wiring layer is made of a metal, for example, but not limited to, copper, but also contains a mixture of both insulative materials and conductive materials. The insulative material is a base material, for example a polyimide or a low-k material. The conductive material is a wiring pattern made of a metal, for example copper.

The thermal conductivity of the insulative material and the thermal conductivity of the conductive material differ by nearly two orders of magnitude. In an embodiment of the present invention, as illustrated in FIG. 5, the thermal conductivity of the insulative material is 0.4 to 2 W/mK and the thermal conductivity of the conductive material is 400 W/mK.

In an embodiment of the present invention, a wiring pattern made of metal that occupies 10% of the entire area of the wiring layer pattern will predominantly contribute to the thermal conductivity on the entire surface of the wiring layer, and thus the insulative material that covers the majority of the area (90%) will not measurably contribute to the thermal conductivity. The wiring layer acts similar to a thermal resistor, thus a thinner wiring layer is preferable.

Figure 6:
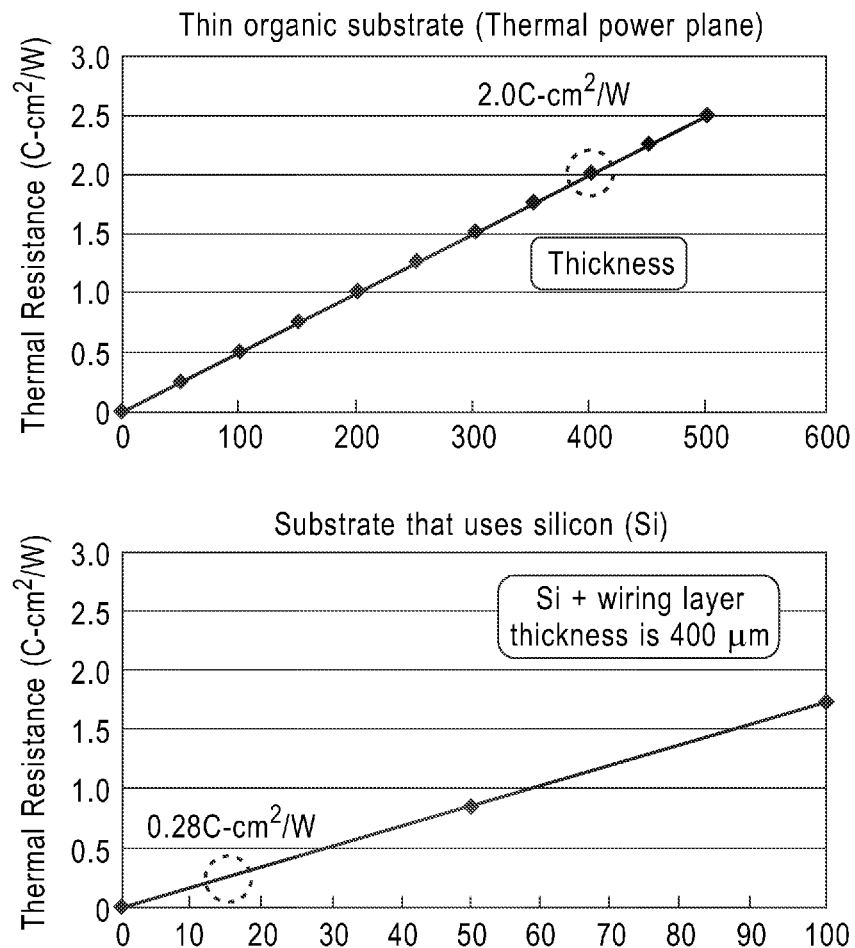
FIG. 6 is a representation of two simple line graphs showing the relationship between the thickness of the wiring layer and thermal resistance in the thin organic substrate and substrate that uses silicon according to an embodiment of the present invention.

FIG. 6 is a representation of two simple line graphs showing the relationship between the thickness of the wiring layer and thermal resistance in the thin organic substrate and substrate that uses Si according to an embodiment of the present invention.

For the organic substrate, the thickness of the wiring layer is at least approximately 400 μm. As demonstrated in the thin organic substrate graph, the thermal resistance of the organic substrate is 2.0 C-cm2/W. As shown in the Substrate that uses silicon graph, the thermal resistance of silicon is 0.28 C-cm2/W. Thus, the thermal resistance of the organic substrate is less than $1/7^{th}$ of the substrate that uses Si. For the present invention, if a graph is drawn by expanding the scale of the horizontal axis six times, the slope of the thermal resistance of the organic substrate will appear steeper than the slope of the thermal resistance of the substrate that uses Si.

Figure 7:
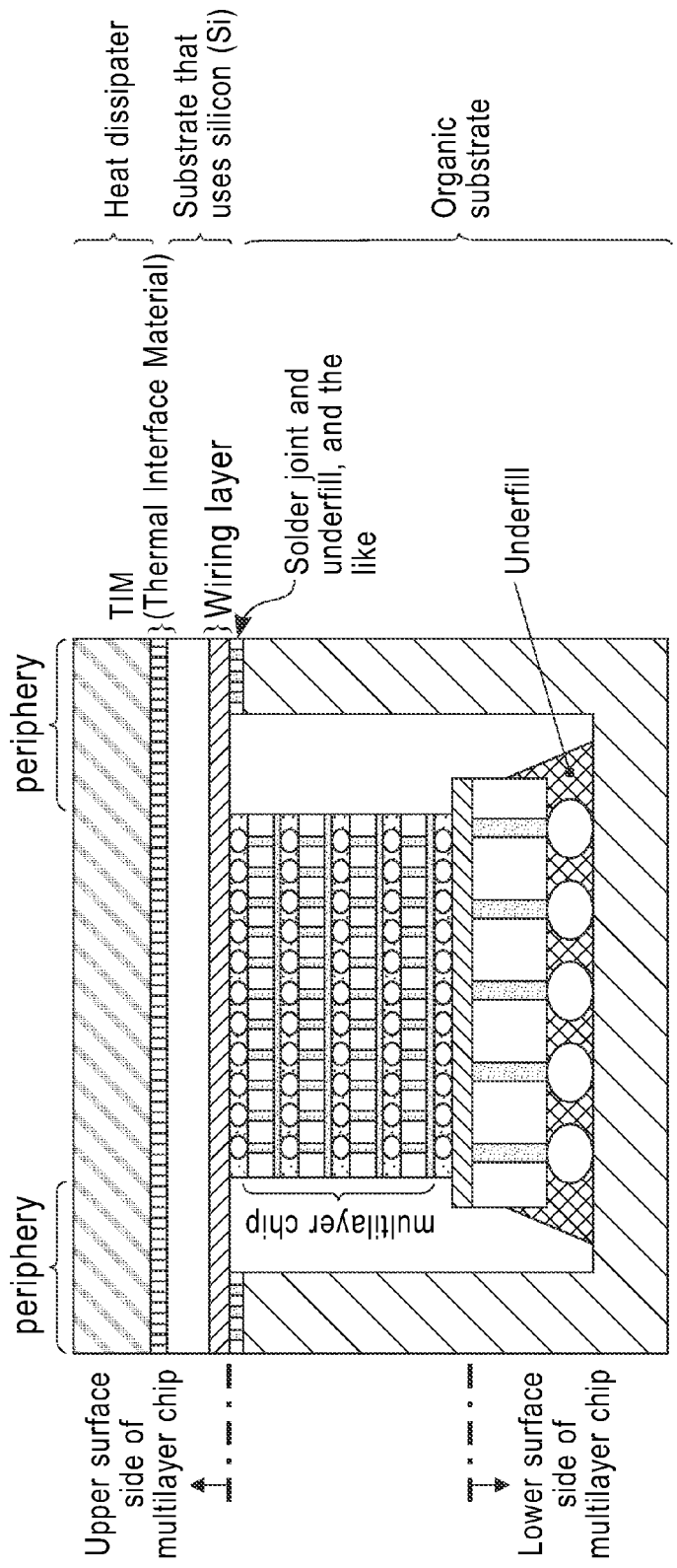
FIG. 7 is an illustration of the three-dimensional multilayer package as a structure with a multilayer chip.

FIG. 7 is an illustration of the three-dimensional multilayer package as a structure with a multilayer chip, according to an embodiment of the present invention. Generally, multilayer chips are increasing in density and integration. In response to this trend three-dimensional multilayer packages are correspondingly becoming larger.

In FIG. 7, the multilayer chip is installed inside the organic substrate by an interposer. The interposer is placed (interposed) from the lower surface side of the multilayer chip as a mediator between elements with a rough pitch even if the pitch of the solder bumps and the (thermal) vias on the multilayer chip is fine.

The power supply is electrically connected to the periphery of the multilayer chip. Power is supplied to the multilayer chip through the wiring layer from the upper surface side of the multilayer chip.

Figure 8:
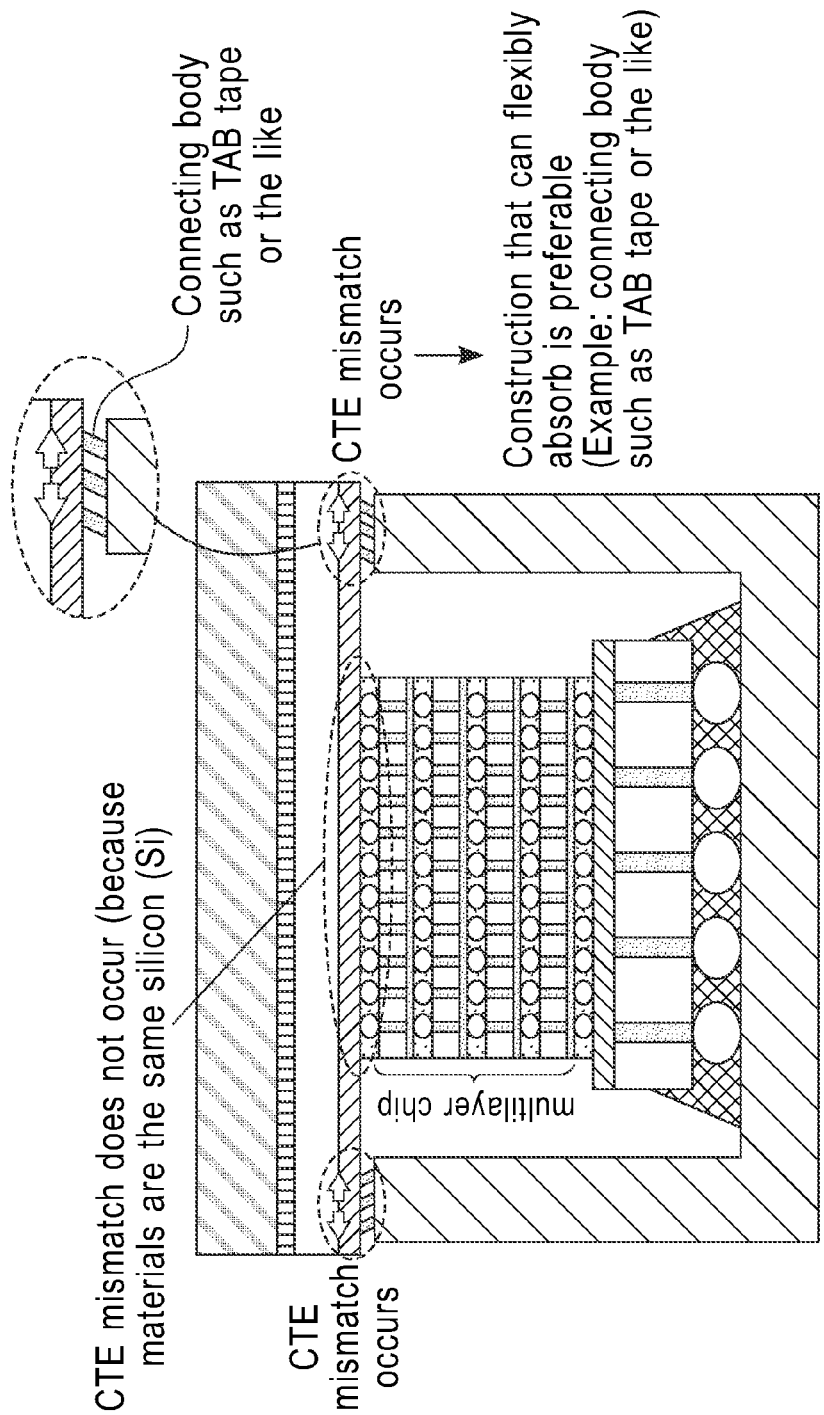
FIG. 8 is a schematic diagram describing improvisations, according to embodiments of the present invention, to reduce mismatching of the coefficient of thermal expansion (CTE) in a three-dimensional multilayer package.

FIG. 8 is a schematic diagram describing improvisations, according to an embodiment of the present invention, to reduce mismatching of the coefficient of thermal expansion (CTE) in a three-dimensional multilayer package.

According to the present invention, the multilayer chip is made of Si. CTE mismatching will not occur with the substrate that uses Si because the materials will have the same CTE. However, CTE mismatching occurs between the organic substrate and the substrate that uses Si. In comparison to the elongation of the organic substrate, Si does not elongate relatively.

In an embodiment of the present invention, in order to relieve the CTE mismatch, a configuration can be utilized that maintains an electrical connection even though mechanical shifting occurs. A connecting body, for example, but not limited to, TAB tape, can be configured to mechanically absorb CTE mismatching by flexibility. By including this configuration, a solder joint and underfill is not necessary at this location.

Figure 9:
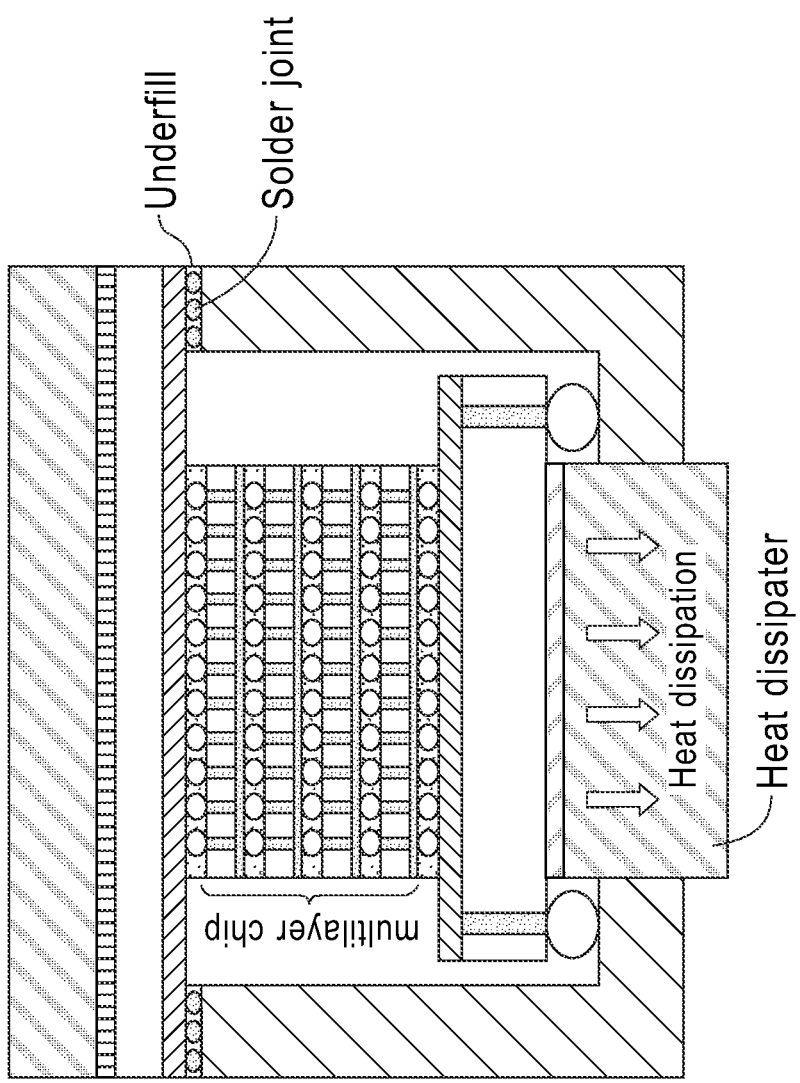
FIG. 9 is a schematic diagram illustrating a configuration that dissipates heat from the lower surface side of the multilayer chip according to an embodiment of the present invention.

FIG. 9 is a schematic diagram illustrating a configuration that dissipates heat from the lower surface side of the multilayer chip. In an embodiment of the present invention, a heat dissipater is placed on the lower surface side of the multilayer chip. Placing the heat dissipater on the lower surface side of the multilayer chip permits heat to dissipate downwards because the organic substrate is not metal and heat does not pass through it.

Figure 10:
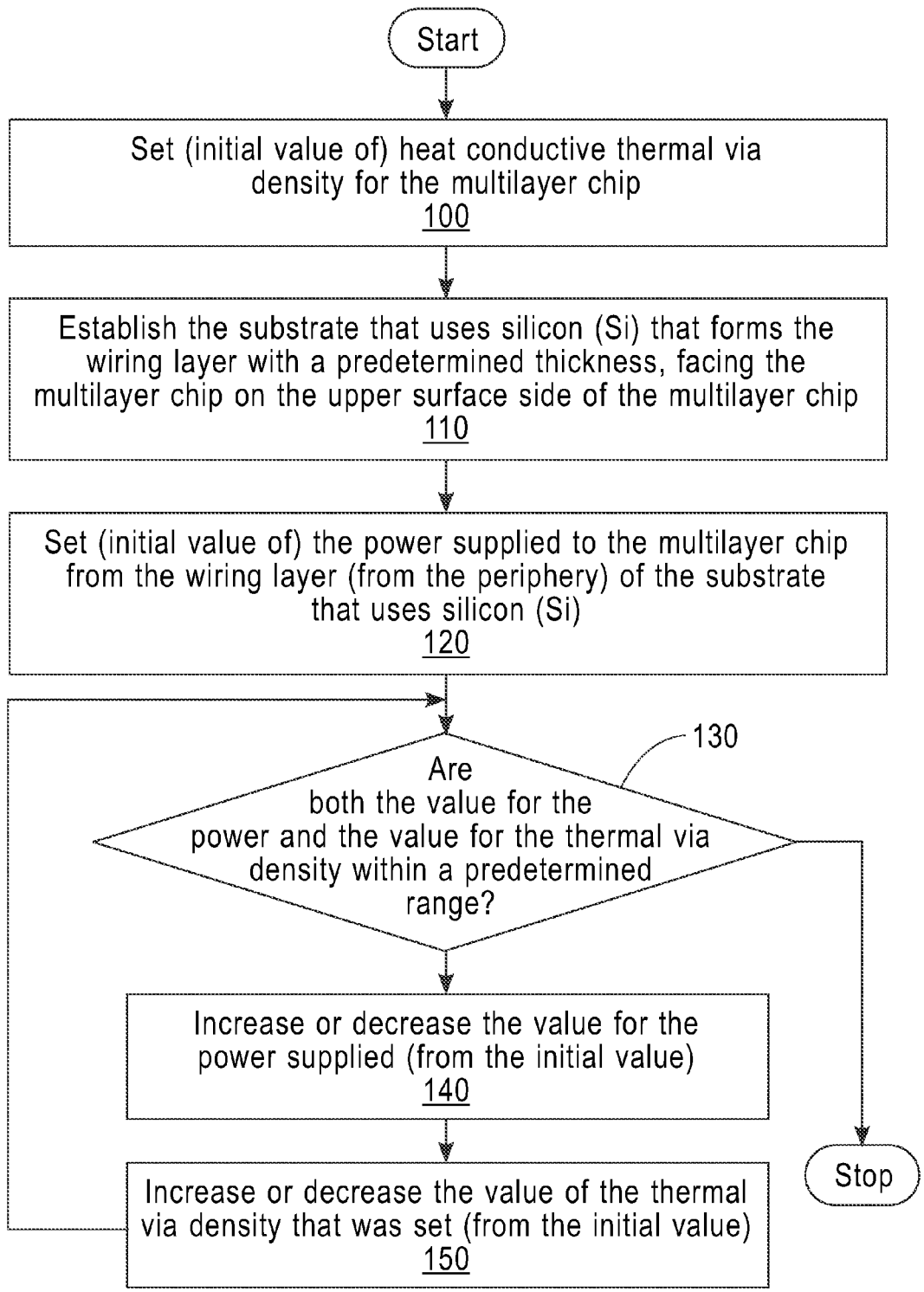
FIG. 10 is a detailed flowchart illustrating a computer implemented design method for simulating a structure where both power supply and heat dissipation have been optimized according to an embodiment of the present invention.

FIG. 10 is a detailed flowchart illustrating a computer-implemented design method for simulating a structure where both power supply and heat dissipation have been optimized according to an embodiment of the present invention.

First, in step 100, the initial value of a heat conductive thermal via density for the multilayer chip is set.

Second, in step 110, a substrate is established. The substrate uses Si and forms the wiring layer with a predetermined thickness. The substrate is placed facing the upper surface side of the multilayer chip.

In an embodiment of the present invention, the thickness of the wiring layer is set in advance and is determined in relation to the power supplied. The thickness of the wiring layer can be increased or decreased from the initial value. For the case of the substrate that uses Si, the initial value for the predetermined thickness of the wiring layer can be 10 μm to 15 μm.

Third, in step 120, the initial value of the power supplied for the multilayer chip is set from the periphery of the wiring layer of the substrate that uses Si.

Fourth, in step 130, a determination is made as to whether or not both the value for the power and the value for the thermal via density converge to a value within a predetermined range as design conditions. This determination includes both power supply and heat dissipation and corresponds to optimization, an objective of the present invention.

During the simulation process, in step 140, the value for the power supplied is increased or decreased from the initial value in order to bring the value within the predetermined range. This step occurs in an embodiment of the present invention when convergence of the value for the power and the value for the thermal via density is not within the predetermined range the value for the power.

In step 150 of the simulation process, if convergence is not within the predetermined range the value for the thermal via density is increased or decreased from the initial value in order to bring the value within the predetermined range.

In an embodiment of the present invention, if convergence within a predetermined range occurs in only one of either step 140 or step 150, only the other step will subsequently need to be performed.

In an embodiment of the present invention, the design method can be performed as a computer-implemented simulation and can be embodied as a computer program.

Figure 11:
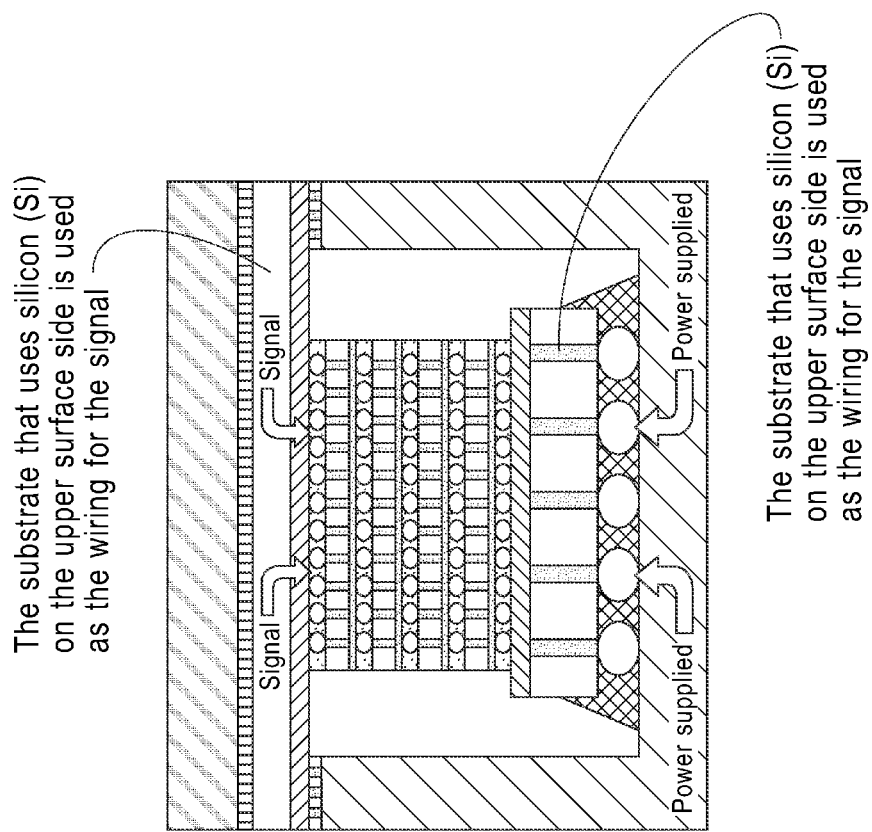
FIG. 11 is a schematic diagram, according to an embodiment of the present invention, illustrating an example of a structure where the signal is supplied from the upper surface side of the multilayer chip and power is supplied only from the lower surface side of the multilayer chip.

In an embodiment of the present invention, SiC, which exhibits a similar level of high thermal conductivity and low CTE as Si, can be included in the substrate as a substitute material for Si. For example, the following physical property values can be suggested:

SiC:
Coefficient of thermal expansion (CTE): 4.5 ppm
Thermal conductivity: 100 to 300 W/mK
Si:
Coefficient of thermal expansion (CTE): 2.6 ppm
Thermal conductivity: 120 to 170 W/mK FIG. 11 is a schematic diagram, according to an embodiment of the present invention, illustrating an example of a structure where the signal is supplied from the upper surface side of the multilayer chip and power is supplied only from the lower surface side of the multilayer chip.

Power is supplied (specialized) to the multilayered chip only from the wiring layer that is formed on the organic substrate from the lower surface side of the multilayered chip. A signal is supplied from the upper surface side of the multilayer chip. Supplying power and supplying the signal is carried out by employing specialized routes. Therefore, the wiring for supplying power can be increased in the wiring layer formed on the organic substrate and wiring for the signal that is formed on the substrate that uses Si can be increased. This embodiment of the present invention is based on the demand that the wiring length be shortened as much as possible because the amount of current flowing in the wiring is high.

Figure 12:
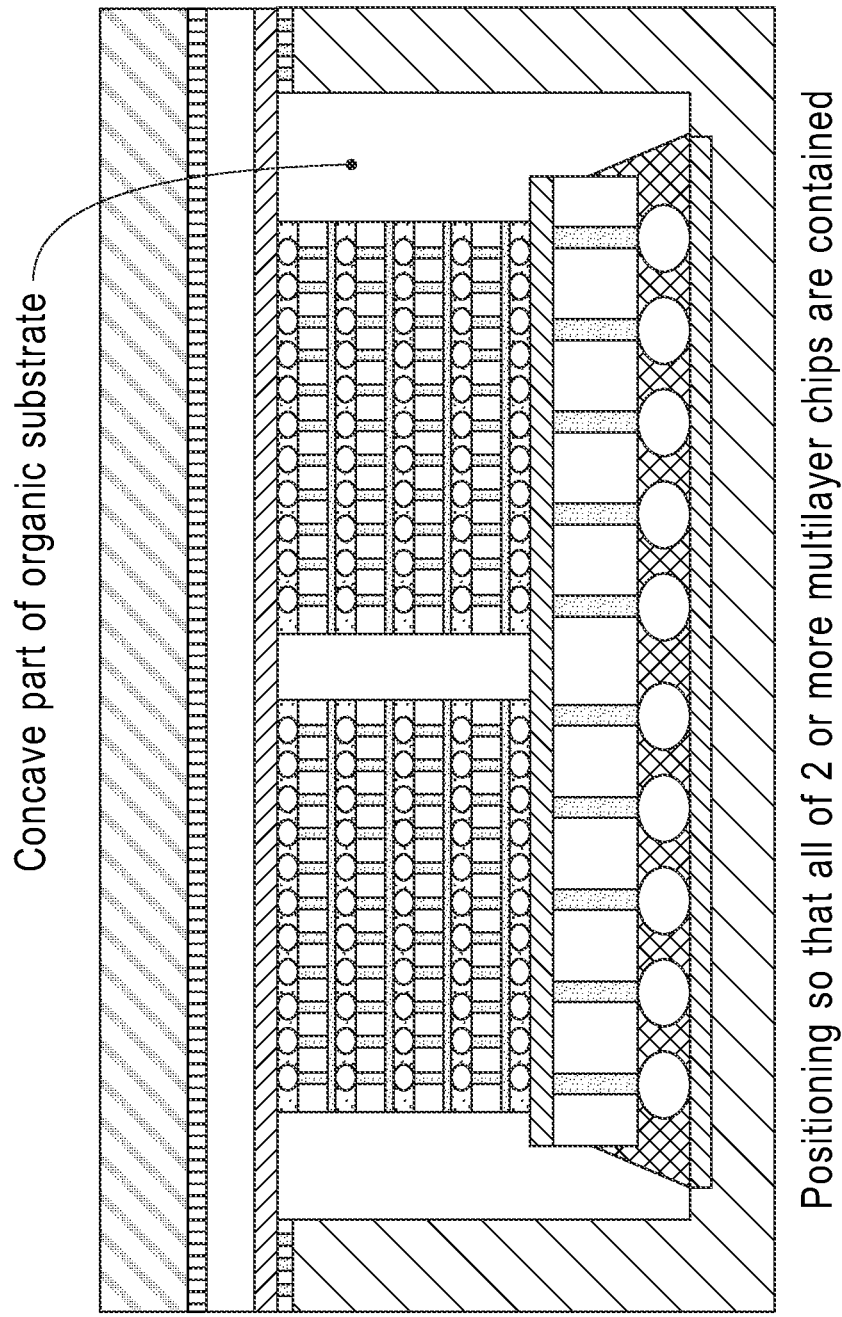
FIG. 12 illustrates a structure, according to an embodiment of the present invention, where at least two multilayer chips are stored in the concave part of the organic substrate.

FIG. 12 is a schematic diagram illustrating a structure, according to an embodiment of the present invention, where at least two multilayer chips are arranged to be stored in the concave part of the organic substrate.

The mechanical reliability of the structure can be increased because at least two multilayer chips are executed as the same process. Furthermore, the space in the concave part of the organic substrate can be effectively utilized, in embodiments of the present invention, the configuration of FIG. 12 can be achieved by leveling the total thickness if the number of layers in the multilayer chip differs for each multilayer chip.

Figure 13:
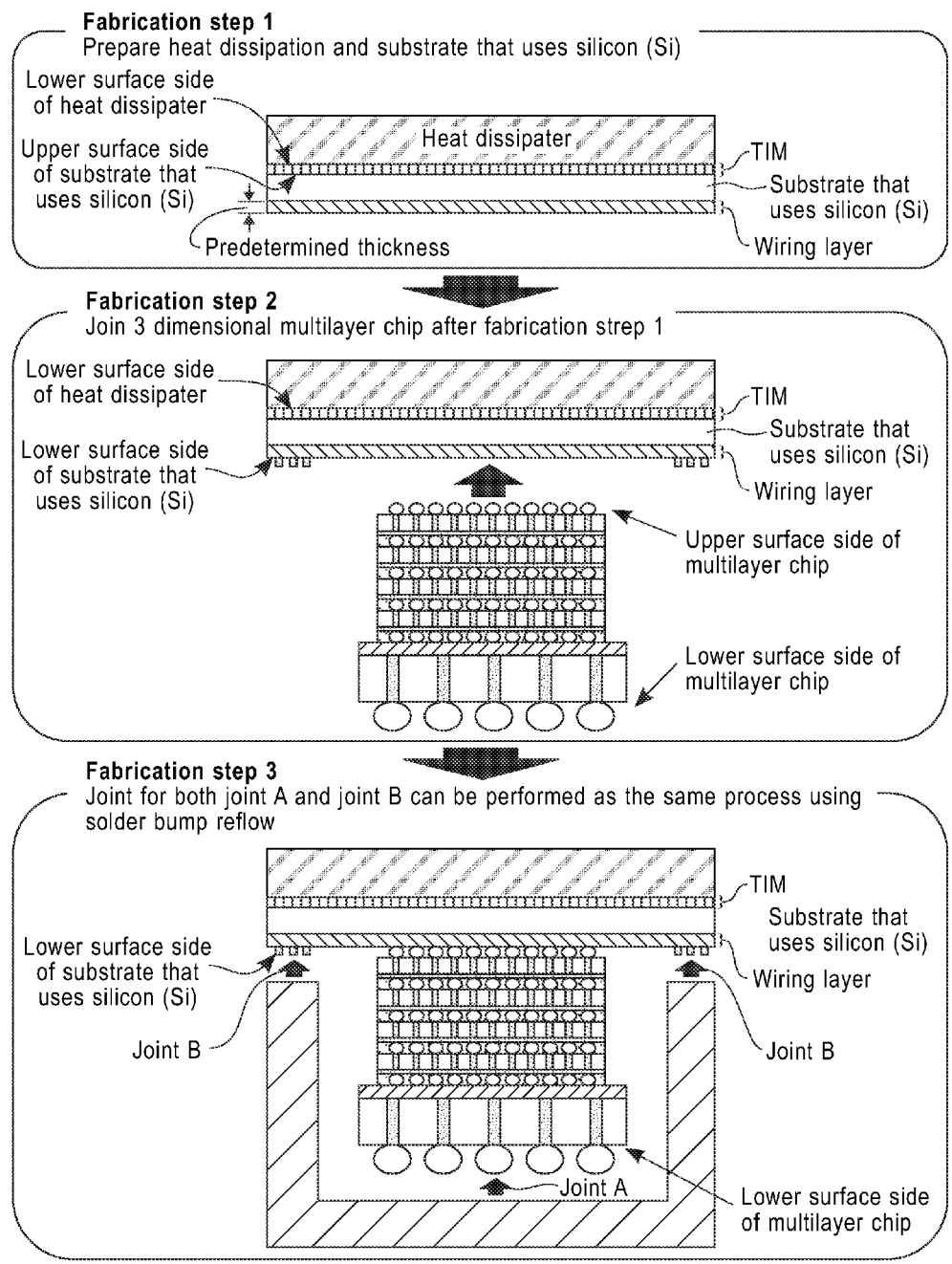
FIG. 13 is a diagram describing the method of fabricating a structure that performs power supply and heat dissipation for a multilayer chip from an upper surface side of the multilayer chip where a plurality of chips are overlaid according to the present invention.

FIG. 13 is a diagram describing the method of fabricating a structure that performs power supply and heat dissipation for a multilayer chip from an upper surface side of the multilayer chip where a plurality of chips are overlaid.

In fabrication step 1, a heat dissipater is prepared. In regard to the lower surface side of the heat dissipater, a wiring layer, with a predetermined thickness, is formed on the lower surface side. The substrate that uses Si is provided. Next, the heat dissipater and the upper surface side of the substrate that uses Si are connected through a Thermal Interface Material (TIM).

In fabrication step 2, the upper surface side of the multilayer chip and the wiring layer on the bottom surface side of the substrate that uses Si are connected. In an embodiment of the present invention, illustrated in FIG. 13, a plurality of solder bumps can be prepared (beforehand) on the lower surface side of the substrate that uses silicon Si. A thermal compression bonding technique can be employed to join the multilayer chip and wiring layer.

In fabrication step 3, the organic substrate with a concave shape is joined to both the lower surface side of the multilayer chip and the wiring layer on the lower surface side of the substrate that uses Si. In an embodiment of the present invention, the entire multilayer chip is stored in the concave part of the organic substrate. Joint A and joint B can be performed as the same process using solder bump reflow.

While the present invention has been described with reference to certain embodiments, it should be understood that the present invention is not limited to these embodiments. Various changes or modifications can be made and equivalents can be substituted without departing from the scope of the present invention. Therefore, it is intended that the present invention not be limited to the particular embodiments disclosed, but that the present invention will include all embodiments falling within the scope of the appended claims.

What is claimed is:

1. A computer-implemented method for designing a package for a stacked multiple-chip Integrated Circuit (IC) structure, the method comprising the steps of:

establishing, using the computer, a silicon (Si)-containing substrate having a wiring layer that optimizes power supply and heat dissipation for the stacked multiple-chip structure from an upper surface side of said stacked multiple-chip structure, said wiring layer supplying power to said stacked multiple-chip structure via a power supply;

setting, using the computer, a heat conductive thermal via density initial value for a chip of said stacked multiple-chip structure, wherein thermal via structures of said chip at said initial value density provide a heat dissipation route in the stacked multi-chip structure;

preparing the Si-containing substrate where said wiring layer is of a predetermined thickness and is formed on a bottom surface side of said Si-containing substrate contacting said upper surface side of said stacked multiple-chip structure and, prior to setting up an initial value of the power supply, connecting a heat dissipater a top an upper surface side of said Si-containing substrate for dissipating heat directly above the upper surface side of said Si-containing substrate;

setting, using the computer, the initial value of the power supply for said stacked multiple-chip structure supplied from said wiring layer of said Si-containing substrate;

determining, using the computer, whether the initial value of the power supply and the initial value of the thermal via density are both within a predetermined range; and based on said determining, performing, using the computer, one or more of:

increasing or decreasing said initial value of the power supply until detecting a convergence of the initial power supply value within the predetermined range; and increasing or decreasing said heat conductive thermal via density initial value until detecting a convergence of the thermal via density initial value within the predetermined range, and fabricating a three-dimensional multilayer chip package including said stacked multiple-chip structure having a thermal via density corresponding to the thermal via density value at the detected convergence, said three-dimensional multilayer chip package for receiving a power supply input at a value corresponding to the power supply value at the detected convergence.

2. The method of claim 1, wherein the initial value for said thickness of said wiring layer is between 10 μm and 15 μm.

3. The method of claim 1, further comprising:
designing, using the computer, the apparatus to further include:
an organic substrate having a concave part, the stacked multiple-chip structure being arranged so that said stacked multiple-chip structure is situated in the concave part of said organic substrate to house the stacked multiple-chip structure.

4. The method of claim 3, further comprising:
designing, using the computer, the apparatus to further include:
an interposer for installing said stacked multiple-chip structure within said concave part of said organic substrate, a bottom surface of said stacked multiple-chip structure for placement on said interposer.

* * * * *